United States Patent
Horley et al.

(10) Patent No.: US 12,045,154 B2
(45) Date of Patent: Jul. 23, 2024

(54) TECHNIQUE FOR COLLECTING STATE INFORMATION OF AN APPARATUS

(71) Applicant: Arm Limited, Cambridge (GB)

(72) Inventors: John Michael Horley, Cambridge (GB); Michael John Williams, Cambridge (GB); Mark Salling Rutland, Cambridge (GB); Alasdair Grant, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/998,299

(22) PCT Filed: May 13, 2021

(86) PCT No.: PCT/GB2021/051152
§ 371 (c)(1),
(2) Date: Nov. 9, 2022

(87) PCT Pub. No.: WO2021/229231
PCT Pub. Date: Nov. 18, 2021

(65) Prior Publication Data
US 2023/0214224 A1 Jul. 6, 2023

(30) Foreign Application Priority Data
May 14, 2020 (GB) .................. 2007123

(51) Int. Cl.
*G06F 9/30* (2018.01)
*G06F 9/38* (2018.01)
(Continued)

(52) U.S. Cl.
CPC ........ *G06F 11/3466* (2013.01); *G06F 9/3867* (2013.01); *G06F 11/34* (2013.01);
(Continued)

(58) Field of Classification Search
CPC .... G06F 11/3466; G06F 9/3867; G06F 11/34; G06F 11/3636; G06F 9/3861; G06F 9/3865; G06F 2201/86; G06F 2201/865
See application file for complete search history.

(56) References Cited

U.S. PATENT DOCUMENTS 6,880,072 B1 4/2005 Giles
6,934,832 B1 8/2005 Van Dyke et al.
(Continued)

FOREIGN PATENT DOCUMENTS

GB 2459652 A 11/2009

OTHER PUBLICATIONS

Robert Bedichek, "Some Efficient Architecture Simulation Techniques", Department of Computer Science, FR-35 University of Washington, Seattle, Washington 98195, 1990.

*Primary Examiner* — Corey S Faherty
(74) *Attorney, Agent, or Firm* — NIXON & VANDERHYE P.C.

(57) ABSTRACT

A technique for collecting state information of an apparatus comprising a processing pipeline for executing a sequence of instructions, and interesting instruction designation circuitry for identifying at least one of the instructions in the sequence as being an interesting instruction. Each interesting instruction is an instruction for which given state information of the apparatus associated with execution of that interesting instruction is to be collected. The interesting instruction designation circuitry is arranged, for each identified interesting instruction, to apply defined selection criteria to determine a further instruction later in the sequence of instructions than the interesting instruction, and to mark that further instruction as having a synchronous exception associated therewith. The processing pipeline is responsive to the further instruction, which causes the processing pipe-
(Continued)

line to execute a given exception handling routine in order to collect the given state information.

20 Claims, 10 Drawing Sheets

(51) Int. Cl.
    *G06F 11/34*     (2006.01)
    *G06F 11/36*     (2006.01)

(52) U.S. Cl.
    CPC ........ *G06F 11/3636* (2013.01); *G06F 9/3861* (2013.01); *G06F 9/3865* (2013.01); *G06F 2201/86* (2013.01); *G06F 2201/865* (2013.01)

(56) References Cited

U.S. PATENT DOCUMENTS

| | | | |
|---|---|---|---|
| 2012/0311307 | A1 | 12/2012 | Chynoweth et al. |
| 2014/0366007 | A1* | 12/2014 | Koltachev ........... G06F 11/3636 717/129 |
| 2017/0052869 | A1* | 2/2017 | Gordon ............... G06F 11/0721 |
| 2018/0225191 | A1* | 8/2018 | Carey .................. G06F 11/366 |
| 2018/0260299 | A1* | 9/2018 | Mola ................... G06F 11/3636 |
| 2021/0081297 | A1* | 3/2021 | Weiss .................. G06F 11/3476 |

* cited by examiner

TECHNIQUE FOR COLLECTING STATE INFORMATION OF AN APPARATUS

BACKGROUND

The present technique relates to a mechanism for collecting state information of an apparatus.

There are many situations where it is desirable to monitor program execution. When performing such monitoring of program execution, it is often desirable to take an exception to supervisory code at certain points in time, such that information relating to execution of the program can be extracted. For example, when performing statistical profiling, execution of certain instructions may cause records to be created to capture information relating to the execution of those instructions, and then an exception may be raised. Typically this is an asynchronous exception, sometimes also referred to as an interrupt, which is issued to an interrupt controller that prioritises amongst multiple sources of interrupts. By such an approach the interrupt controller can then trigger a suitable exception handling routine to reference the records created by such statistical profiling.

As another example, performance monitoring techniques may be used to track occurrences of certain events, for example using a series of counters, and at certain points in time an asynchronous exception may be raised to the interrupt controller so that an exception handling routine can be run in order to review the event information being maintained as a result of such performance monitoring.

In addition to the above information that may be captured when monitoring program execution, it may be desirable to capture other information about the state of the apparatus at the time events occurred that caused information to be captured by those program monitoring techniques. However, by the time an asynchronous exception has been selected by the interrupt controller, causing the relevant exception handling routine to be executed, continued execution of the program will have occurred in the intervening period, and hence the state of the system at the time the exception handling routine is executed may not accurately reflect the state of the system at an earlier point in time of interest, and accordingly it can be difficult to correlate such state information of the apparatus with the information obtained from the monitoring of program execution.

SUMMARY

In one example arrangement, there is provided an apparatus comprising: a processing pipeline to execute a sequence of instructions; and interesting instruction designation circuitry to identify at least one of the instructions in the sequence as being an interesting instruction, each interesting instruction being an instruction for which given state information of the apparatus associated with execution of that interesting instruction is to be collected; wherein: the interesting instruction designation circuitry is arranged, for each identified interesting instruction, to apply defined criteria to determine a further instruction later in the sequence of instructions than that interesting instruction, and to mark that further instruction as having a synchronous exception associated therewith; and the processing pipeline is responsive to the further instruction reaching a given stage of the processing pipeline and being marked as having the synchronous exception associated therewith, to trigger the synchronous exception instead of executing the further instruction, which causes the processing pipeline to execute a given exception handling routine in order to collect the given state information.

In another example arrangement, there is provided a method of collecting given state information of an apparatus comprising: employing a processing pipeline to execute a sequence of instructions; and identifying at least one of the instructions in the sequence as being an interesting instruction, each interesting instruction being an instruction for which given state information of the apparatus associated with execution of that interesting instruction is to be collected; for each identified interesting instruction, applying defined criteria to determine a further instruction later in the sequence of instructions than that interesting instruction, and marking that further instruction as having a synchronous exception associated therewith; and responsive to the further instruction reaching a given stage of the processing pipeline and being marked as having the synchronous exception associated therewith, triggering the synchronous exception instead of executing the further instruction, which causes the processing pipeline to execute a given exception handling routine in order to collect the given state information.

In a still further example arrangement, there is provided a computer program for controlling a host data processing apparatus to provide an instruction execution environment comprising: processing program logic to execute a sequence of instructions in a series of pipeline stages; and interesting instruction designation program logic to identify at least one of the instructions in the sequence as being an interesting instruction, each interesting instruction being an instruction for which given state information associated with execution of that interesting instruction is to be collected; wherein: the interesting instruction designation program logic is arranged, for each identified interesting instruction, to apply defined criteria to determine a further instruction later in the sequence of instructions than that interesting instruction, and to mark that further instruction as having a synchronous exception associated therewith; and the processing program logic is responsive to the further instruction reaching a given pipeline stage and being marked as having the synchronous exception associated therewith, to trigger the synchronous exception instead of executing the further instruction, which causes the processing program logic to execute a given exception handling routine in order to collect the given state information.

In a yet further example arrangement, there is provided an apparatus comprising: processing pipeline means for executing a sequence of instructions; and interesting instruction designation means for identifying at least one of the instructions in the sequence as being an interesting instruction, each interesting instruction being an instruction for which given state information of the apparatus associated with execution of that interesting instruction is to be collected; wherein: the interesting instruction designation means is arranged, for each identified interesting instruction, to apply defined criteria to determine a further instruction later in the sequence of instructions than that interesting instruction, and to mark that further instruction as having a synchronous exception associated therewith; and the processing pipeline means, in response to the further instruction reaching a given stage of the processing pipeline means and being marked as having the synchronous exception associated therewith, for triggering the synchronous exception instead of executing the further instruction, which causes the processing pipeline means to execute a given exception handling routine in order to collect the given state information.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
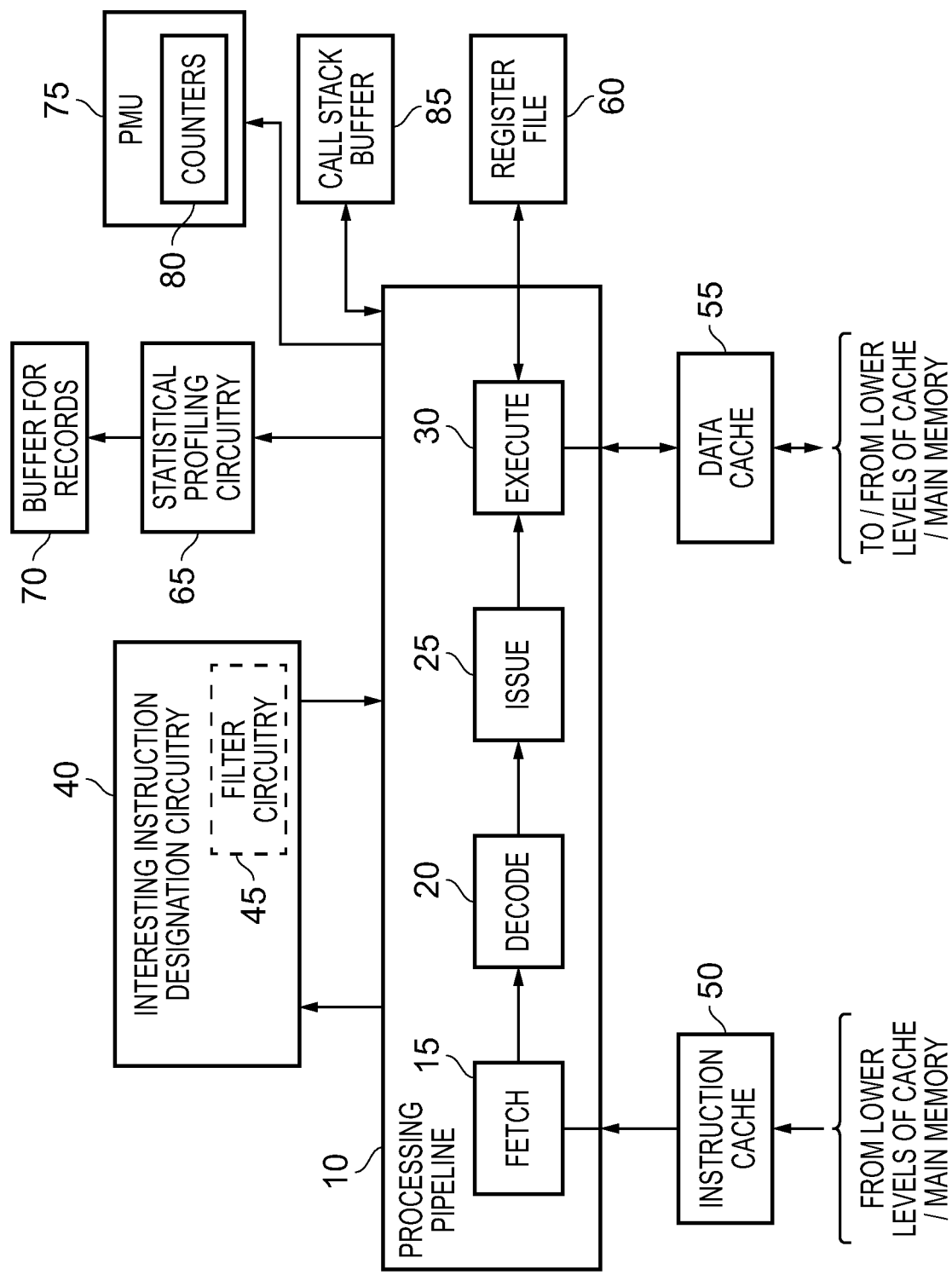
FIG. 1 is a block diagram of an apparatus in accordance with one example implementation.

As discussed earlier, there are various techniques that can be used for monitoring program execution, such as statistical profiling that generates records in association with execution of certain instructions, and performance monitoring that can keep track of the occurrences of certain events during execution of the program. In the latter case, those events are often caused by execution of particular instructions.

In accordance with the techniques described herein, an apparatus is provided that has a processing pipeline for executing a sequence of instructions, and interesting instruction designation circuitry to identify at least one of the instructions in the sequence as being an interesting instruction, each interesting instruction being an instruction for which given state information of the apparatus associated with execution of that interesting instruction is to be collected.

Hence, in accordance with the techniques described herein, certain instructions are identified as being instructions for which it is desirable to obtain associated state information about the state of the apparatus when those instructions were executed. However, as mentioned earlier, when monitoring program execution, it is typically the case that asynchronous exception mechanisms are used, and in particularly the circuits provided within the apparatus to monitor the program execution may raise asynchronous exceptions at certain points in time, that are then processed by an interrupt controller resulting in due course in an exception handling routine being invoked to handle those asynchronous exceptions. However, if such mechanisms are used following the execution of the interesting instruction, it has been found that there is a significant skid between the point in time at which the interesting instruction was executed and the subsequent point in time at which the exception handling routine is executed. Hence, while such an exception handling routine could be arranged to gather the required state information of the apparatus, it is likely that that state information gathered may well not accurately represent the state of the apparatus at the time the interesting instruction was executed, and hence may be of little use.

Another type of exception that exists is a synchronous exception. When a synchronous exception is associated with an instruction, then rather than the instruction being executed, a synchronous exception is taken when that instruction is encountered, for example when that instruction reaches a certain stage in the processor pipeline. The use of synchronous exceptions can be useful in a variety of situations, for example to implement a "fault on instruction" mechanism. For instance, if a load or store instruction is seeking to access an area of memory that it does not have permission to access, then instead of seeking to execute the load or store instruction, the synchronous exception technique can be used to raise a fault.

However, raising a synchronous exception instead of executing the interesting instruction would not be useful, as it is necessary for the interesting instruction to be executed in order that given state information of the apparatus associated with execution of that interesting instruction can then be captured. It may also be necessary for the interesting instruction to be executed in order for information associated with the execution of that instruction to be captured by the above mentioned program monitoring circuits, e.g. the earlier-discussed statistical profiling or performance monitoring circuits.

In accordance with the techniques described herein, in order to alleviate the earlier-mentioned problem associated with skid between the time an asynchronous exception is raised and the time the associated exception handling routine is invoked, the above concept of synchronous exceptions is utilised, but not in association with the interesting instruction itself. In particular, the interesting instruction designation circuitry is arranged, for each identified interesting instruction, to apply defined criteria to determine a further instruction later in the sequence of instructions than that interesting instruction, and is then arranged to mark that further instruction as having a synchronous exception associated therewith. Depending on the criteria used to choose the interesting instruction, it may be that the further instruction has already been fetched by the processing pipeline, but if not the interesting instruction designation circuitry may enter a state where it is monitoring the fetched instructions, waiting for an instruction meeting the criteria (for example a next instruction of a particular type) to be fetched, at which point that instruction can be identified as the further instruction.

The processing pipeline is then responsive to the further instruction reaching a given stage of the processing pipeline, and being marked as having a synchronous exception associated therewith, to trigger the synchronous exception instead of executing the further instruction. This causes the processing pipeline to execute a given exception handling routine in order to collect the given state information. The given stage of the processing pipeline that causes the synchronous exception to be triggered when the further instruction reaches that stage can be any suitable stage within the processing pipeline. It could for example be the execute stage where the further instruction would be executed, in which case instead of executing that further instruction, the synchronous exception is triggered. However, the given stage could alternatively be an earlier stage than the execute stage, where again triggering the synchronous exception takes place instead of allowing the further instruction to proceed to execution.

It should be noted that in addition to the execution of the given exception handling routine being used to collect the given state information, the apparatus may also be collecting additional information using other existing mechanisms, such as the statistical profiling or performance monitoring mechanisms discussed earlier. Due to the given state information collected by the given exception handling routine being triggered by a synchronous exception when the further instruction reaching a given stage of the processing pipeline, it is much more likely that that given state information can be correlated with that other information, that other information for example including information that was associated with the execution of the interesting instruction. In particular, because the further instruction is selected by the interesting instruction designation circuitry in dependence on the identified interesting instruction, there is a much more deterministic correlation between the time of execution of the interesting instruction and the point in time at which the given exception handling routine is executed in response to the synchronous exception triggered by the further instruction than there would be had the earlier-described asynchronous exception mechanism been used.

It should be noted however that the above technique is useful even if there is not other information being collected by other components in the system. In particular, the given state information may in fact be the only information collected, but may still usefully provide information that is correlated with the execution of the interesting instruction, due to the way in which the further instruction is selected by the interesting instruction designation circuitry.

As mentioned above, due to the synchronous exception being associated with the further instruction, the processing pipeline triggers the synchronous exception instead of allowing the further instruction to be executed, when that further instruction reaches the given stage of the processing pipeline. In one example implementation, when in due course execution returns from the given exception handling routine, the processing pipeline may then be arranged to execute the further instruction. Hence, the association of the synchronous exception with the further instruction may merely in effect delay the execution of that further instruction, whilst the exception handling routine is executed.

The defined criteria that are applied by the interesting instruction designation circuitry in order to determine a further instruction for each identified interesting instruction can take a variety of forms. In one example implementation, the defined criteria causes the interesting instruction designation circuitry to determine, as the further instruction, an instruction appearing at a predetermined position in the sequence of instructions relative to the interesting instruction. Hence, the interesting instruction designation circuitry may merely select, as the further instruction, the N-th instruction following the interesting instruction, where N may be selected dependent on implementation. For instance, how N is chosen may depend on expected instruction dependencies. For example, if interesting instruction X is immediately followed by instruction Y in the instruction sequence, but the processing pipeline allows out of order execution, and typically it turns out to be the case that instruction Y in fact executes before instruction X, then associating the synchronous exception with instruction Y would enforce ordering between instructions X and Y, and prevent instruction Y executing until after instruction X. This could potentially cause some probe effect that it may wish to be avoided, and in that instance it may be decided to make N larger than 1. However, in the absence of such instruction dependency issues, it may be determined appropriate to set N equal to 1, so as to minimise the gap between the interesting instruction being executed and the synchronous exception being triggered off the further instruction.

As another example, the defined criteria may cause the interesting instruction designation circuitry to determine, as the further instruction, an instruction of at least one given type appearing in the sequence of instructions after the interesting instruction. Various types of instruction may be chosen here, but of particular interest are instructions which, if executed, might cause a change in the given state information that it is desired to collect. In particular, as discussed earlier, it is desirable that that given state information provides useful information about the state of the apparatus at the time the interesting instruction was executed, and accordingly it would be desirable to avoid execution of any later instructions which might modify that given state information in a way that prevented the form of that state information at the time of the execution of the interesting instruction to be determined.

As examples of certain types of instruction that may wish to be considered by the interesting instruction designation circuitry when choosing the further instruction, certain types of load or store instruction may be of interest, since they would cause the contents of the register bank to change. As another example, the program being executed may consist of a number of different subroutines. Some types of instruction will cause a transition between those subroutines, which in turn will cause a change in the content of certain state information maintained by the apparatus to keep track of those subroutines. As an example, a call stack buffer can maintain information that is used to handle transitions between the subroutines, with an entry being added to the top of that buffer each time a transition to a new subroutine is to take place in order to capture information used when returning from that subroutine in due course. Similarly, a most recently added entry to the call stack buffer is removed, and the information stored therein consumed, each time a return from a subroutine takes place.

The defined criteria applied by the interesting instruction designation circuitry may monitor any number of given types of instruction of interest, for example considering all of the above-mentioned examples of instructions, or only a subset of them, and can then be arranged to determine, as the further instruction, the instruction of the one or more monitored types that appears next in the sequence of instructions after the interesting instruction. Alternatively, the defined criteria may be such that the interesting instruction designation circuitry does not designate as the further instruction the next appearing instruction of the one of more monitored types, but instead the N-th instruction of the one of more monitored types appearing within the sequence of instructions.

In one example implementation, the instruction of the at least one given type may be a return instruction used to return the processing pipeline to execution of program code that was being executed prior to execution of a current subroutine. Alternatively, or in addition, the instruction of the at least one given type may be a branch with link instruction that, when executed, will cause the processing pipeline to halt processing of a current subroutine and begin executing a further subroutine.

The current subroutine referred to above when discussing the return instruction and the branch with link instruction may take a variety of forms, but in one example implementation the current subroutine may be the subroutine that includes the interesting instruction, and thus the above described technique can be used to associate the synchronous exception with a further instruction appearing within the same subroutine as the subroutine containing the interesting instruction, thereby enabling the given state information (such as the earlier-mentioned content of the call stack buffer) to be captured by the exception handling routine before a change in subroutine takes place, and hence before there is a chance of the given state information of interest being altered in a way that prevents a determination of the form of that state information at the time the interesting instruction was executed.

As another example approach that can be taken to determine the further instruction, the defined criteria may be such as to cause the interesting instruction designation circuitry to determine, as the further instruction, any instruction appearing in the sequence of instructions after the interesting instruction up to, but not beyond, a next instruction of at least one given type appearing in the sequence of instructions after the interesting instruction. Hence, when adopting such an approach, the actual instruction chosen as the further instruction is not considered important, provided it is an instruction appearing after the interesting instruction and up to, but not beyond, an instruction of a particular type. Purely by way of example, it may be desired for the synchronous exception to occur before the next branch with link instruction after the interesting instruction is encountered, or at least at the latest by the time that next branch with link instruction is encountered, and the above-mentioned approach can achieve this aim without otherwise restricting exactly which instruction has the synchronous exception associated therewith.

In one example implementation the apparatus further comprises statistical profiling circuitry, responsive to execution of a given interesting instruction, to generate a record comprising a plurality of items of information relating to the execution of that given interesting instruction. In such an implementation, the given state information collected by executing the given exception handling routine may comprise additional information not included in the record generated by the statistical profiling circuitry. Hence, through use of the above described mechanism, information over and above that collected within the record generated by the statistical profiling circuitry can be obtained through execution of the given exception handling routine.

The plurality of items of information that are generated within the record by the statistical profiling circuitry can take a variety of forms, but purely by way of a non-exhaustive example, the record could identify the instruction address of the interesting instruction, the instruction type (for example whether it is a branch instruction, a load instruction, a store instruction etc.), the execution context (for example what exception level the processing pipeline is in, and hence for example whether the processing pipeline is operated in user space, operating system space or hypervisor space), what software process is running in that exception level (which may also be referred to as a context identifier), the latency of the interesting instruction, etc.

The additional information that forms the given state information collected by executing the given exception handling routine could take a variety of forms, but in one example comprises at least one item of software defined state associated with execution of the given interesting instruction. Such software defined state would not naturally be captured by statistical profiling circuitry, but can provide useful additional information when seeking to analyse the record generated for the interesting instruction. It can, for example, be used to seek to work out what path of instruction execution was followed prior to reaching the interesting instruction.

Whilst the software defined state can take a variety of different forms, one item of such software defined state may comprise the content of the earlier-mentioned call stack buffer maintained by the apparatus. By having knowledge of the content of the call stack buffer, it may be possible to determine the sequence of subroutines that have been executed prior to the subroutine that included the interesting instruction.

In one example implementation, the statistical profiling circuitry is further arranged to include, within the plurality of items of information relating to the execution of the given interesting instruction, an indication of a current call stack buffer pointer value at a time the given interesting instruction was executed. In situations where the given state information collected by execution of the given exception handling routine comprises at least the content of the call stack buffer, then the provision of this additional piece of information within the record, namely the call stack buffer pointer value that existed at the time the given interesting instruction was executed, can assist in interpreting the contents of the call stack buffer. In particular even if the call stack buffer pointer has changed in the interim, between the point the interesting instruction was executed and the time the content of the call stack buffer was collected by the exception handling routine, it may be possible, when armed with the additional information about the call stack buffer pointer value that existed at the time the interesting instruction was executed, to reconstruct exactly the content of the call stack buffer at the time the interesting instruction was executed.

This information about the current call stack buffer pointer value that existed at the time the given interesting instruction was executed could be used directly by the exception handling routine to decide which portion of the call stack content to collect, or alternatively the exception handling routine may capture the entire call stack content, and then at some later point the information about the current call stack buffer pointer value at the time the given interesting instruction was executed can be used when analysing the captured call stack content.

There are a number of ways in which the interesting instruction designation circuitry may be arranged to identify each interesting instruction. However, in one example implementation the interesting instruction designation circuitry is arranged to apply selection criteria to identify each interesting instruction for which the statistical profiling circuitry is to record the plurality of items of information when that interesting instruction is executed. There are a number of forms of selection criteria that could be used. For example, the selection criteria could be arranged so that every N-th instruction is selected, or could apply more complex criteria, such as seeking to detect occurrence of particular types of instruction which are then selected as interesting instructions.

When using the techniques described herein, in situations where statistical profiling is performed, then the statistical profiling circuitry could be arranged to generate a record for each identified interesting instruction, and in addition a further instruction would then be identified for each interesting instruction, with that further instruction having a synchronous exception associated therewith in order to cause a given exception handling routine to be executed when that further instruction reaches a given stage of the processing pipeline, using the synchronous exception mechanism described earlier. Whilst this allows the earlier-mentioned given state information to be collected by the exception handling routine, for use for example in combination with the record generated for each interesting instruction by the statistical profiling circuitry, it can lead to an increase in the number of exceptions that are taken. For instance, without use of the present technique, it might be that the statistical profiling circuitry could generate records for multiple interesting instructions, storing those records in a buffer, and then at some predetermined point issue an asynchronous exception, so that an exception was not necessarily taken for every interesting instruction.

Whilst the present described technique has the benefit of enabling certain state information of the apparatus to be collected for each interesting instruction, in some instances it may be desirable to reduce the amount of exception handling required within the apparatus. In one example implementation this is achieved by arranging the selection criteria to comprise initial selection criteria and further selection criteria. The interesting instruction designation circuitry may then be arranged to apply the initial selection criteria in order to identify candidate interesting instructions. However, the interesting instruction designation circuitry may further comprise, in addition, filter circuitry that applies the further selection criteria to determine which candidate interesting instructions are to be used as the actual interesting instructions. Hence, it is possible to filter out some of the initially selected candidate interesting instructions, thereby reducing the number of times an exception handling routine is triggered in response to synchronous exceptions associated with the corresponding further instructions.

The time at which the filtering mechanism is performed may vary depending upon implementation. For example, in one implementation the filter circuitry may be arranged to only treat a candidate interesting instruction as being an interesting instruction when a type of that candidate interesting instruction is of one or more given types of instruction. Hence, by such an approach, the filtering can be applied relatively early on, for example at the decode stage in the pipeline, in order to reduce down the number of interesting instructions that will be considered by the apparatus.

However, alternatively, or in addition, the filter circuitry may be arranged to treat a candidate interesting instruction as being an interesting instruction when a given behaviour is observed when that candidate interesting instruction is executed. Hence, in accordance with such an approach, a candidate interesting instruction can be passed through the pipeline, and a decision as to whether that candidate interesting instruction is in fact to be treated as an interesting instruction can be deferred until the execution behaviour of that candidate interesting instruction is known. This can enable interesting instructions to effectively be dropped from further consideration as interesting instructions if their execution behaviour is not of interest. Merely by way of illustrative example, load or store instructions may be identified as candidate interesting instructions, but it may be decided that it is only of interest to seek to collect the earlier-mentioned given state information in association with those load or store instructions that have a relatively long latency. Hence, any load or store instructions that execute relatively quickly may be dropped at that stage from further consideration as interesting instructions, so that it is only the relatively slowly executing load or store instructions that are retained as interesting instructions, and hence whose associated further instructions have the synchronous exception retained in association therewith.

In one example implementation, the statistical profiling circuitry is responsive to execution of a given candidate interesting instruction to obtain the plurality of items of information relating to the execution of that given candidate interesting instruction, but to only maintain the record comprising those plurality of items of information when the filter circuitry determines that the given behaviour is observed. Hence, the statistical profiling circuitry can initially treat the candidate interesting instruction like any other interesting instruction and start to collect together the plurality of items of information that it would wish to store in a record in association with that interesting instruction. However, if the earlier-mentioned given behaviour of the candidate interesting instruction is not observed at the time that that instruction is executed, then it can be decided to not maintain the record for that interesting instruction.

With regards to handling of the further instruction, if the record has not been maintained for the associated candidate interesting instruction, then the apparatus may be arranged not to take the synchronous exception when the further instruction is encountered, but instead allow the further instruction to merely proceed to execution as usual.

There are a number of ways in which the further instructions associated with candidate interesting instructions can be handled. In one example implementation, only when a candidate interesting instruction is treated by the filter circuitry as being an actual interesting instruction will the associated further instruction be marked as having a synchronous exception associated therewith at the time that further instruction reaches the given stage of the processing pipeline. Hence, by the time the further instruction reaches that stage of the processing pipeline, it may no longer be treated as having a synchronous exception associated therewith if the candidate interesting instruction is no longer to be treated as an actual interesting instruction.

In one example implementation, the further instruction may only have a synchronous exception associated therewith once it had been decided that the candidate interesting instruction was an actual interesting instruction. Alternatively, the further instruction associated with a candidate interesting instruction may initially have a synchronous exception associated therewith, but if later it is decided that the candidate interesting instruction is not going to be treated as an actual interesting instruction, then that synchronous exception association can be removed from the further instruction.

In some example implementations, the apparatus may further comprise performance monitoring circuitry for maintaining a record indicative of the occurrences of one or more event during execution of the sequence of instructions. In such instances, the interesting instruction designation circuitry may be arranged to identify a given instruction in the sequence as being an interesting instruction when execution of that given instruction causes a given event to occur and the performance monitoring circuitry indicates that the occurrences of that given event have reached a threshold level. By such an approach, a synchronous exception can be triggered in response to the associated further instruction, thereby enabling the earlier-mentioned given state information to be captured, with that information then being available for further analysis, for example to provide some further contextual information relevant to the point at which occurrences of the given event had reached the threshold level. The given state information captured when the given exception handling routine is executed can take a variety of forms. It could for example be of the form discussed earlier, for instance providing at least one item of software defined state associated with execution of the given interesting instruction, such as the content of the call stack buffer.

In one example implementation, execution of the given exception handling routine in response to the further instruction associated with the given instruction reaching the given stage of the processing pipeline, causes a current state of the record maintained by the performance monitoring circuitry to be captured in addition to the given state information. Hence, in addition to the earlier-mentioned given state information that may be captured, the content of the record maintained by the performance monitoring circuitry, or at least a subset of that content, can also be captured when the exception handling routine triggered by the further instruction is executed.

The record maintained by the performance monitoring circuitry can take a variety of forms, but in one example implementation comprises, for each of the one or more events, a counter value indicating a number of occurrences of that event since the counter value was initialised. The events tracked by the various counters can take a variety of forms, and indeed any suitable metrics within the system can be tracked if desired. Purely by way of example, one of the counters may be used to track the number of cache misses within a particular cache. For instance, when load or store instructions are executed, it can be determined whether there is a miss in the level one data cache or not, and if so an event counter for the cache miss event can be incremented. When keeping such counters for a variety of events within the apparatus, this can provide a useful performance monitoring record that can be analysed later when seeking to analyse program execution.

Considering the above-mentioned cache miss example, then when execution of a load or store instruction causes the event counter for cache misses to reach a threshold level, then that load or store instruction can be marked as an interesting instruction, and the interesting instruction designation circuitry can then apply selection criteria to determine an associated further instruction which is to have the synchronous exception associated therewith. When that further instruction then reaches a given stage in the pipeline, the synchronous exception will be triggered, causing the earlier-mentioned exception handling routine to be executed in order to collect the state information of the apparatus that is desired, and optionally to also gather information about all or a subset of the counters maintained by the performance monitoring circuitry.

As another example use case for the technique described herein, it may be useful to detect situations where the call stack buffer reaches a certain threshold level of fullness or emptiness. As discussed earlier, a call stack buffer can maintain information that is used to handle transitions between subroutines, where an entry is added to the call stack buffer each time a branch with link instruction is encountered in order to capture information used when returning from a subroutine entered in response to that branch with link instruction. Furthermore, a most recently added entry is removed from the call stack buffer, and the information stored therein consumed, each time a return instruction is encountered. The information maintained within the entries of the call stack buffer can take a variety of forms. For example, an entry may comprise an address relating to the caller of the subroutine (either of the branch with link instruction, or the target of the subroutine return which will be the next sequential instruction after that branch with link instruction), or an address related to the called subroutine.

Whatever information is stored within the call stack buffer, the buffer is of a finite size, and hence intervention may be needed if the buffer reaches a fullness or emptiness threshold, for example if the buffer becomes full or becomes empty.

In accordance with the techniques described herein, the interesting instruction designation circuitry may be arranged to identify a given instruction in the sequence as being an interesting instruction when execution of that given instruction causes a number of entries in the call stack buffer to reach a trigger level. A further instruction is then identified to which a synchronous exception is pended, so that when that further instruction reaches the given stage in the pipeline, the synchronous exception is taken, in order to cause an exception handling routine to be executed which can then capture system state that may be useful when analysing the state of the call stack buffer.

In one example implementation, the trigger level indicates that the call stack buffer is full, and the given instruction identified as the interesting instruction is a branch with link instruction that causes the trigger level to be reached. The further instruction is then a subsequent instruction flow changing instruction of a given type. For example, of particular interest here would be a subsequent branch with link instruction, as this would seek to add another entry to the call stack buffer in a situation where the call stack buffer is already full. However, in some example implementations, it may be easier to mark as the further instruction the next instruction flow changing instruction that would cause any interaction with the call stack buffer, and accordingly in one example implementation the further instruction may be the first occurring of a subsequent branch with link instruction or a subsequent return instruction. When the exception handling routine is triggered in due course by that subsequent instruction flow changing instruction reaching the given stage of the pipeline, the exception handling routine can then determine whether any intervention is required with regards to the state of the call stack buffer.

Similarly, the trigger level may alternatively, or in addition, indicate that the call stack buffer is empty. In situations where the trigger level indicates that the call stack buffer is empty, the given instruction identified as the interesting instruction may be a return instruction that causes the trigger level to be reached. Again, the further instruction may be a subsequent instruction flow changing instruction of a given type. Here, of particular interest is a subsequent return instruction that may seek to pop an entry from the stack in a situation where the stack is already empty. However, for the same reason as was discussed earlier, it may be decided that it is simpler from a hardware point of view to mark as the further instruction the next occurrence of any instruction flow changing instruction that would interact with the call stack buffer, and hence for example mark as the further instruction the next occurring one of either a return instruction or a branch with link instruction.

Particular examples will now be described with reference to the Figures.

FIG. 1 is a block diagram of an apparatus in accordance with one example implementation. A processor pipeline 10 is provided for executing a sequence of instructions fetched from memory. The processing pipeline comprises a number of stages, for example the fetch stage 15, the decode stage 20, the issue stage 25 and the execute stage 30 shown in FIG.

1. It will be appreciated that in some systems there may be further stages within the processing pipeline, for example a rename stage to facilitate register renaming in out of order processors.

The fetch stage 15 is arranged to issue fetch requests to memory, which are processed via instruction cache 50 (and any intervening levels of cache as necessary), in order to retrieve a sequence of instructions for execution. The fetch circuitry may have access to certain structures to assist in determining which instructions to fetch, for example branch prediction circuitry used to predict whether branch instructions will be taken or not taken, and in some instances to predict target addresses for taken branches.

The fetched instructions are passed through decode stage 20, where they are decoded in order to identify the operations that need to be performed by the processing pipeline in order to implement execution of each instruction. The decoded instructions are then passed to an issue stage 25 where they are queued awaiting dispatch to the execute stage 30. The execute stage 30 may comprise a number of different execution units for performing various data processing tasks, for example an arithmetic logic unit (ALU), a floating point unit (FPU), a load/store unit (LSU), etc. Load instructions within the fetched sequence can be executed within the LSU in order to load data from memory via one or more caches (including data cache 55) into registers of the register file 60. Similarly, store instructions can be executed within the LSU in order to store data from the registers in the register file 60 back to memory (the store operation may cause the data to be cached in a cache of the cache hierarchy, such as data cache 55, rather than being written back to memory at that time).

The issue stage can be arranged to dispatch instructions to the execute stage once the source operands required by those instructions are available, for example once those source operand values become available in the register file 60, or on some forwarding path provided to the execute stage 30.

Statistical profiling circuitry 65 may be arranged, in response to the execution of certain instructions, to generate a record comprising a plurality of items of information relating to the execution of those instructions. A buffer 70 may be provided for storing the records generated by the statistical profiling circuitry 65. The items of information captured within each record by the statistical profiling circuitry can take a variety of forms, dependent upon implementation, but generally are items of information relating to the execution of the instruction with which that record is related. Hence, for example, the record may capture the instruction address, the instruction type, the execution context (for example which exception level the processing pipeline 10 is operating in), an indication of the software process that is running in that exception level (which may also be referred to as a context identifier), information about the latency of that instruction, etc. Such records can later be analysed as part of the process of monitoring program execution within the processing pipeline 10. Such monitoring activities may be performed in various situations, for example when seeking to debug program code, or during normal operation of the processing pipeline.

Other structures can also be used to obtain useful information that can be analysed when monitoring program execution. An example is a performance monitoring unit (PMU) 75 which can track certain events of interest occurring within the apparatus. For example the PMU 75 may maintain a series of counters 80, where each counter is associated with a particular event, with the counters being incremented in order to keep track of the number of occurrences of each event of interest. The events of interest can take a variety of forms, but one specific example may be a counter that is used to track cache misses in a particular cache, such as a level 1 data cache 55 coupled to the LSU of the execute stage 30. As with the records produced by the statistical profiling circuitry 65, the counters 80 kept by the PMU 75 can provide useful information when analysing the operation of the apparatus during program execution.

However, when analysing such information, it can also be useful to have access to certain state information about the state of the apparatus at the time certain records were created by the statistical profiling circuitry and/or at the time certain thresholds within the counters were reached. Alternatively, it may be useful to obtain such state information to give an indication of the form of that information at certain interesting points in time, such as execution of a particular instruction. The state information of interest can take a variety of forms, but in one example implementation is at least one item of software defined state, such software defined state not typically being tracked by components such as the statistical profiling circuitry 65 or the PMU 75. As a particular example, the content of a call stack buffer 85 at the time particular instructions are executed may be useful, that information either being useful in its own right, or to provide additional context when analysing information such as the records produced by the statistical profiling circuitry 65 or the counters 80 produced by the PMU 75.

In accordance with the techniques described herein, a mechanism is provided that enables desired state information of the apparatus to be collected at a point in time where that state information as captured may be indicative of the state that existed at the time a certain interesting instruction was executed, whilst not directly interfering with the execution of that interesting instruction. In particular, interesting instruction designation circuitry 40 is provided that is arranged to apply certain criteria in order to identify one or more interesting instructions appearing in the sequence of instructions executed within the processing pipeline 10. The interesting instructions can be chosen in a variety of ways. For example, considering the statistical profiling circuitry 65, then each instruction that is used to trigger the statistical profiling circuitry to generate a record may be designated as an interesting instruction by the interesting instruction designation circuitry 40. As another example, when an instruction is executed that causes one of the events being tracked by the PMU 75 to occur, and occurrence of that instance of the event causes a corresponding counter 80 in the PMU to reach a threshold level, then that instruction may also be identified as an interesting instruction.

As a yet further example, instructions that cause a change in a subroutine being executed by the processing pipeline 10 may cause entries to be pushed onto the call stack buffer 85 or popped from the call stack buffer, and if execution of such an instruction causes a certain fullness or emptiness threshold of the call stack buffer 85 to be reached, then that instruction can also be identified as an interesting instruction.

In accordance with the techniques described herein, when an interesting instruction is identified by the interesting instruction designation circuitry 40, the interesting instruction designation circuitry also applies defined criteria in order to determine a further instruction later in the sequence of instructions than that interesting instruction, and then marks that further instruction as having a synchronous exception associated therewith.

As a result, the execution of the interesting instruction proceeds unaltered, but when the further instruction reaches a given stage of the processing pipeline, and assuming the synchronous exception is still associated with it (also referred to herein as being pended to the further instruction), then this can be used to trigger a synchronous exception rather than the further instruction proceeding to execution. The given stage at which this analysis is performed can be any suitable stage within the processing pipeline 10. In one example implementation it may be the execute stage 30, but in alternative implementations an earlier stage in the processing pipeline may be used as the given stage that causes the synchronous exception to be triggered when the further instruction reaches that stage.

When the synchronous exception is triggered, this causes the processing pipeline to execute a given exception handling routine in order to collect the above mentioned state information of interest, such as for example the content of the call stack buffer 85. This can be stored internally or output from the apparatus, and may be combined with other information, such as an associated record produced for the instruction of interest by the statistical profiling circuitry 65, or the contents of one or more counters 80 maintained by the PMU 75, as for example may be useful when the interesting instruction caused an event to occur that in turn caused one of the counters to reach a threshold level.

Due to the fact that the synchronous exception is not associated with the interesting instruction itself, this does not prevent the interesting instruction from executing in its normal manner. However, by appropriate selection of the further instruction to be associated with the interesting instruction, it can be ensured that a synchronous exception is taken at a deterministic point in time following execution of the interesting instruction, which can significantly increase the usefulness of the state information collected when the exception handling routine is executed in response to that synchronous exception.

Figure 2:
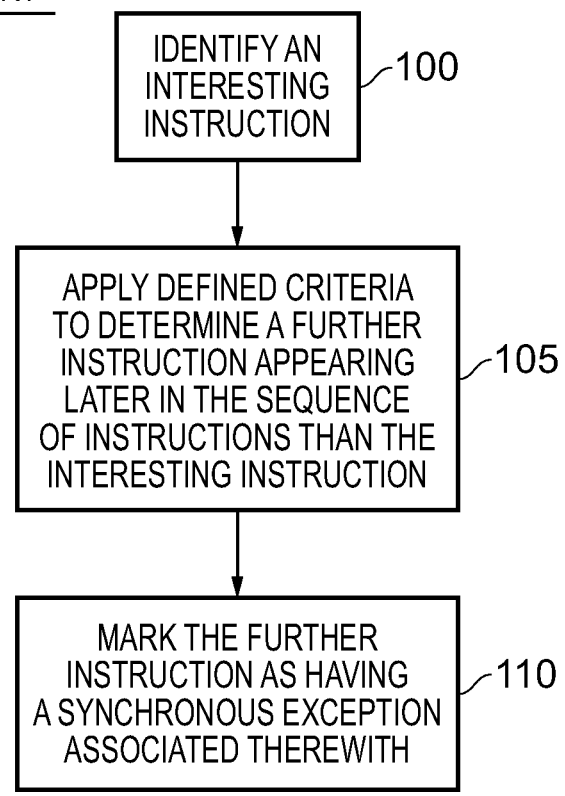
FIG. 2 is a flow diagram illustrating the operation of the interesting instruction designation circuitry of FIG. 1 in one example arrangement.

FIG. 2 is a flow diagram illustrating an operation of the interesting instruction designation circuitry 40. At step 100, an interesting instruction is identified by the interesting instruction designation circuitry 40. As discussed earlier a variety of different criteria could be used to identify each interesting instruction. For example, the interesting instruction designation circuitry may monitor for instructions of particular types and mark those as interesting instructions, and/or may be arranged to identify every N-th instruction within the sequence as an interesting instruction.

Once an interesting instruction has been identified, then at step 105 defined criteria are applied to determine a further instruction appearing later in the sequence of instructions than the interesting instruction. The criteria applied here can take a variety of forms, and some examples will be discussed later with reference to FIGS. 5A to 5C. However, the aim is to identify a suitable instruction so that when the synchronous exception is triggered in response to that instruction, causing certain state information to be collected, then there is a likelihood that that state information is representative of the form of that state information at the time the interesting instruction was executed, or at least is of a form where such information can be deduced from the state information as captured.

Once the further instruction has been identified at step 105, then that further instruction is marked as having a synchronous exception associated therewith at step 110, and that marking of the further instruction is passed through the processing pipeline along with the further instruction. As will be discussed in more detail later, in some example implementations there is a possibility that the association of the synchronous exception with the further instruction may be removed before the further instruction reaches the given stage referred to earlier, but assuming the synchronous exception is still pended to the further instruction by the time that further instruction reaches the given stage, then this will trigger a synchronous exception, causing the earlier-mentioned exception handling routine to be executed in order to collect the given state information.

Figure 3:
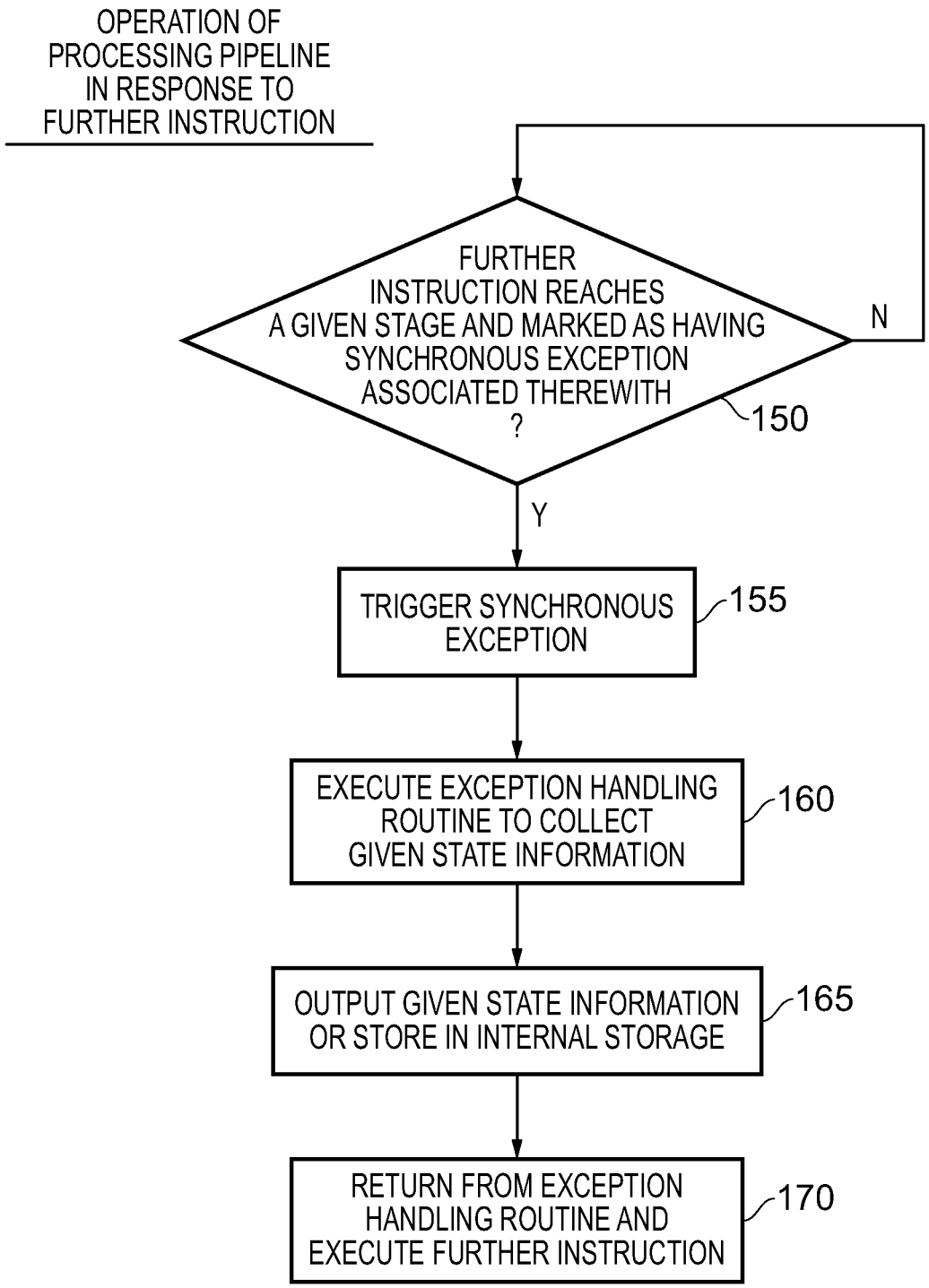
FIG. 3 is a flow diagram illustrating the operation of the processing pipeline in response to a further instruction that has been identified by the interesting instruction designation circuitry, in accordance with one example arrangement.

This process is discussed in more detail with reference to FIG. 3. In particular, at step 150 it is determined whether the further instruction has reached the given stage of the processing pipeline and is still marked as having the synchronous exception associated therewith. As discussed earlier, the given stage may, for example, be the execute stage 30, but could alternatively be an earlier stage in the processing pipeline.

If at step 150 it is determined that the further instruction has reached the given stage and is marked as having a synchronous exception pended thereto, then a synchronous exception is triggered at step 155. This causes the processing pipeline to halt execution of the fetched instructions, and instead execute an exception handling routine to collect the given state information at step 160. The exact exception handling routine that is executed is typically dependent on the form of the synchronous exception, and hence the synchronous exception triggered at step 155 will be used to determine the particular exception handling routine that needs to be executed.

At step 165, once the given state information has been collected by the exception handling routine, it is then output from the apparatus, or alternatively is stored within some suitable internal storage structure of the apparatus for later analysis. Then, at step 170, the processing returns from the exception handling routine, and can then resume execution of the instruction stream. At this point, the further instruction can then proceed to be executed. This may occur immediately on returning from the exception handling routine, for example if the given stage at which the synchronous exception was triggered was the execute stage, or alternatively it may be that one or more other instructions are first executed, whilst the further instruction is passed through the reminder of the processing pipeline until it reaches the execute stage, and at that point the further instruction is executed.

Figure 4:
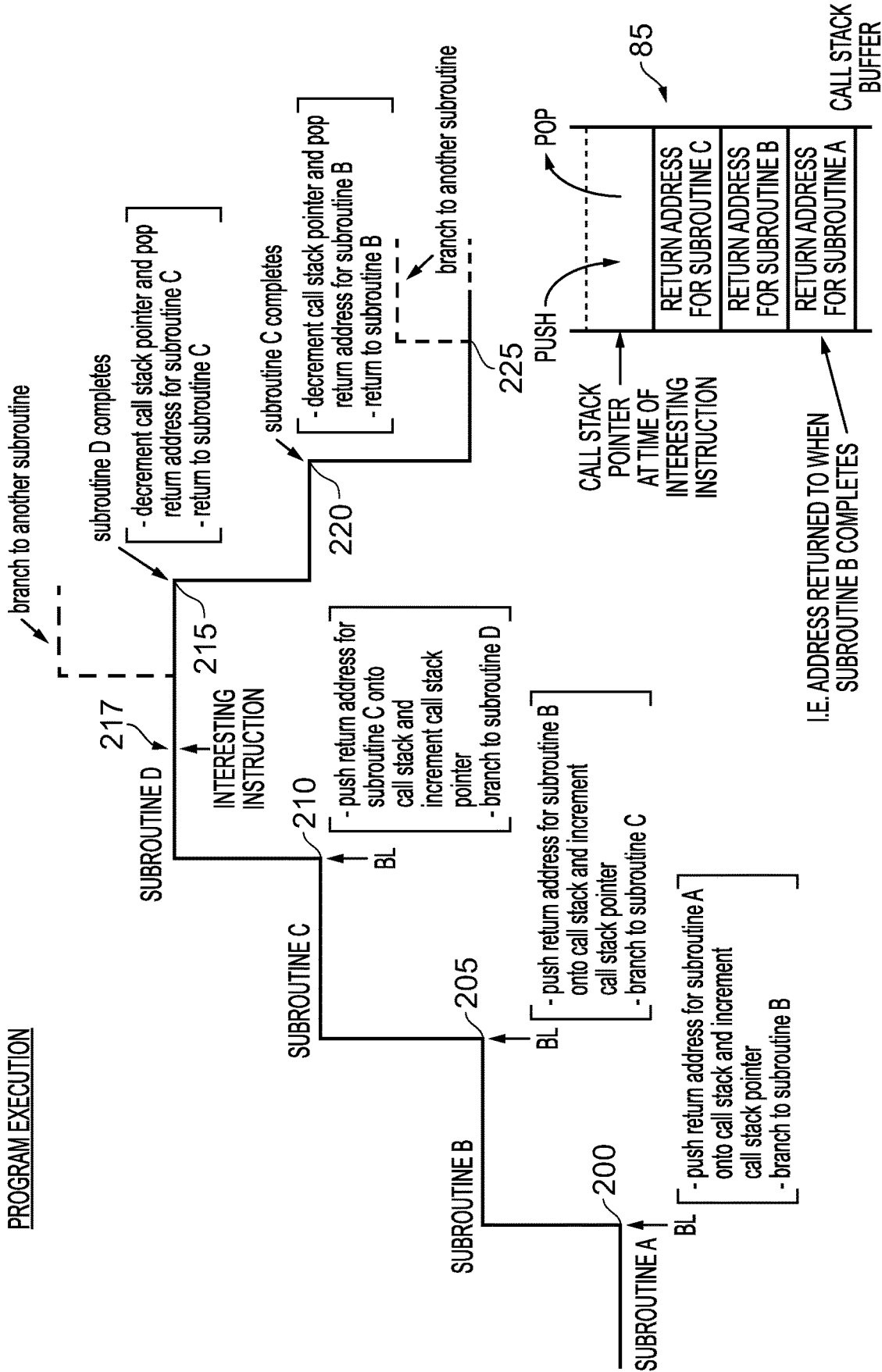
FIG. 4 is a flow diagram schematically illustrating the use of a call stack buffer during program execution.

FIG. 4 schematically illustrates one form of state information that may usefully be captured by the techniques described herein. In particular, the state information may include the content of the call stack buffer 85. The call stack buffer is used to maintain information for handling transitions between subroutines, where an entry is added to the call stack buffer each time a branch with link (BL) instruction is encountered in order to capture information used in due course when returning from a subroutine entered in response to that BL instruction. Such an action is typically referred to as pushing an entry onto the call stack buffer. Further, a most recently added entry is removed, and the information as stored therein consumed, each time a return instruction is encountered, such an action typically being referred to as popping an entry from the stack.

The information pushed onto the call stack buffer in response a BL instruction can take a variety of forms, provided that it indicates information sufficient to enable a subsequent return from the subroutine that is being branched to by the BL instruction. In the example shown in FIG. 4, each time a BL instruction is encountered, the return address for the subroutine that is being branched from by the BL instruction is pushed onto the call stack buffer. A call stack pointer is maintained to identify the uppermost entry of the call stack buffer at any particular point in time. Hence, considering FIG. 4, it is assumed that initially subroutine A is executing, and then at point 200 a BL instruction is encountered that causes a transition to subroutine B. This causes a return address for subroutine A (i.e. the address of the next instruction to be executed in subroutine A when in due course processing returns to subroutine A) to be pushed onto the entry of the call stack pointed to by the current call stack pointer. In addition, the call stack pointer is then incremented, and the processing branches to subroutine B. As shown by points 205, 210, in this example a number of subroutines are nested, and accordingly further return address entries are pushed onto the call stack buffer 85 each time there is a change in subroutine due to a BL instruction. Hence, at point 205, the return address of subroutine B is pushed onto the call stack, and then the call stack pointer is incremented, and in addition the processing then branches to subroutine C. Similarly, at point 210, the return address for subroutine C is pushed onto the call stack and the call stack pointer is incremented, with the processing then proceeding to subroutine D.

At this point in time, the content of the call stack buffer 85 is as shown in FIG. 4. In particular, there are three entries storing the return addresses for subroutines A, B and C, and the call stack pointer has been incremented to point to the next empty entry. When point 215 is reached, a return instruction is encountered indicating that subroutine D has completed. At this point, the call stack pointer is decremented and the entry then pointed to by the call stack pointer is popped from the call stack. This information provides the return address for subroutine C, allowing processing to return to execution of subroutine C. It should be noted that at this point, whilst the entry containing the return address for subroutine C has been popped, and its information consumed, that information is not typically overwritten at that time. However, since the current call stack pointer now points to that entry, then if a subsequent BL instruction is encountered it will overwrite the return address information for subroutine C due to the pushing of the new return address onto the call stack within the entry pointed to by the call stack pointer.

At step 220, it is assumed that another return instruction is encountered, causing a decrementing of the call stack pointer and the popping of the return address now pointed to by that call stack pointer, namely the return address for subroutine B. The processing then returns to subroutine B.

If by way of example an interesting instruction occurs at point 217 in subroutine D, then it may be desirable to capture the content of the call stack buffer as it was at the time that interesting instruction was executed. As discussed earlier, this will be the form of the call stack buffer 85 as shown in FIG. 4. However, if another BL instruction is encountered before that call stack buffer content is collected, then a new entry will be pushed onto the call stack buffer and the call stack buffer content will have changed. Similarly, if one or more return instructions are encountered, then entries will be popped from the call stack, and the call stack pointer will be decremented. Whilst that popped information is not immediately overwritten, the current call stack pointer will at least no longer correspond to the call stack pointer as existed at point 217. Further, if a subsequent BL instruction is encountered, such as indicated at point 225, and that occurs before the exception handling routine is triggered to capture the call stack buffer state information, then this could cause content of the call stack buffer that was present at point 217 to be overwritten so that it could no longer be determined.

Figure 5A:
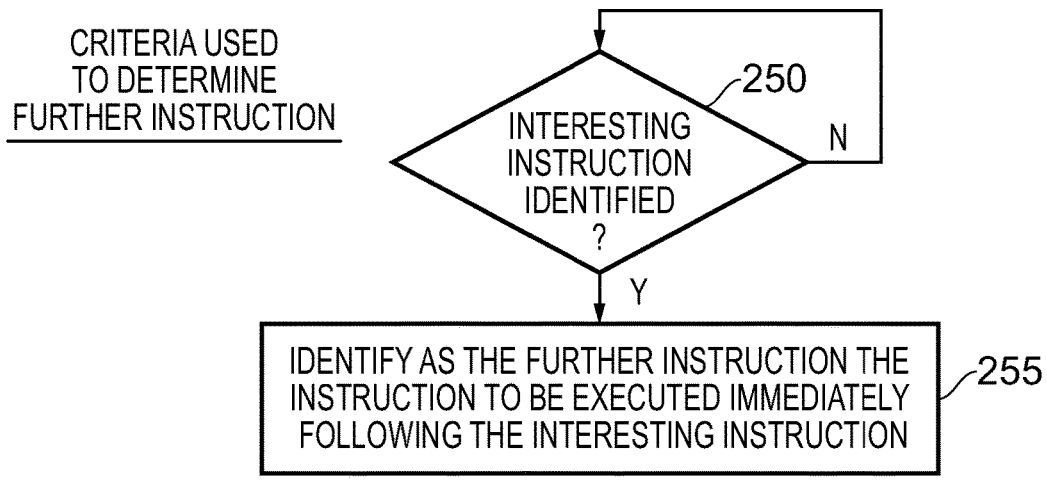
FIGS. 5A to 5C illustrate various types of criteria that can be used to determine a further instruction, in accordance with the techniques described herein.
Figure 5B:
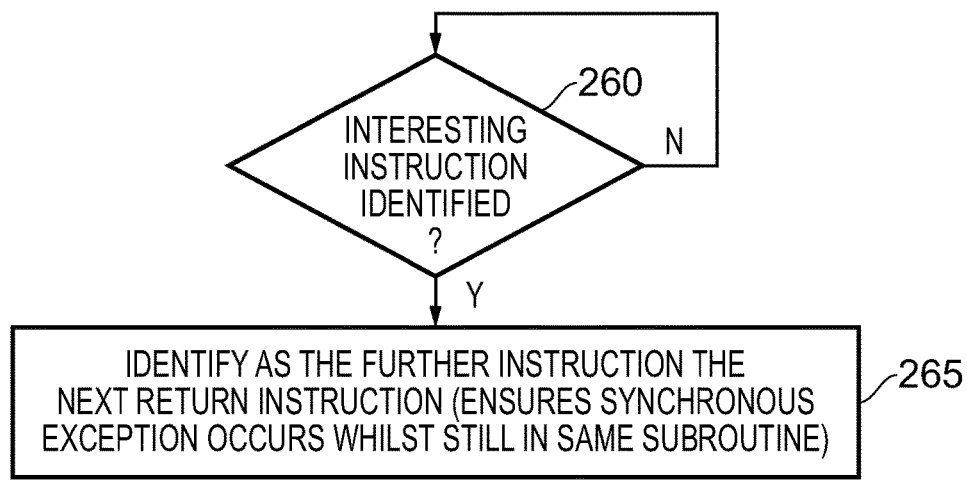
Figure 5C:
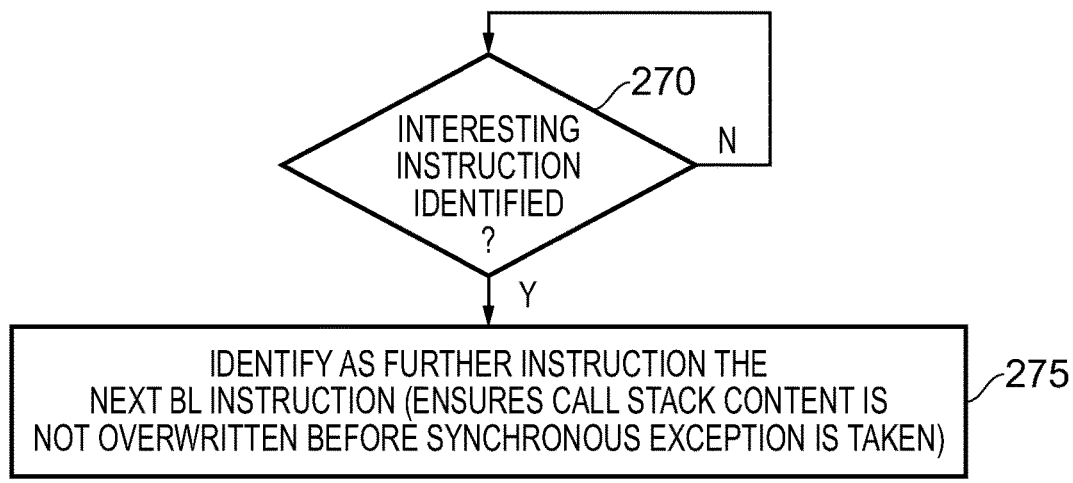

In accordance with the techniques described herein, the possibility of such scenarios occurring can be reduced by appropriate selection of the further instruction that follows the interesting instruction, and hence which causes the triggering of the synchronous exception. Three possible example approaches are shown in FIGS. 5A to 5C. In accordance with FIG. 5A, when an interesting instruction is identified at step 250, the processing proceeds to step 255 where the interesting instruction designation circuitry 40 identifies, as the further instruction, the instruction to be executed immediately following the interesting instruction. This hence avoids the possibility that processing will transition to a different subroutine before the state of the call stack buffer is captured.

However, in some instances it may be decided not to be appropriate to mark, as the further instruction, the immediately following instruction. For example, out of order execution of instructions may be supported, and it might normally be the case that the immediately following instruction would be allowed to execute before the interesting instruction. However, by designating the immediately following instruction as the further instruction, and hence pending a synchronous exception to it, this prevents such reordering, and could introduce a probe effect. If this was considered to be an issue, then this may be alleviated by pending a synchronous exception to the N-th instruction following the interesting instruction, where N is greater than 1.

As another example of a technique that can be used to select the further instruction, as shown in FIG. 5B, when the interesting instruction is identified at step 260, then the interesting instruction designation circuitry 40 may be arranged to identify as the further instruction the next return instruction. In the absence of another BL instruction occurring before the next return instruction, this will ensure that the synchronous exception occurs whilst still in the same subroutine. However, even if another BL instruction does occur, causing a new entry to be pushed onto the stack, by identifying as the further instruction the next return instruction, this ensures that the call stack pointer is not decremented below the value of that call stack pointer at the time the interesting instruction occurred, and hence avoids the risk that the relevant call stack content that did exist at the time of the interesting instruction is overwritten.

As another example, as indicated in FIG. 5C, when the interesting instruction is identified at step 270, then at step 275 the instructing instruction designation circuitry 40 may identify as the further instruction the next BL instruction. This ensures that, even if one or more return instructions are encountered first, causing the call stack pointer to be decremented, no overwriting of the call stack content will occur before the synchronous exception is taken. Hence, by measures such as those discussed above, it is possible to allow the interesting instruction to be executed as normal, but to provide a deterministic point at which a synchronous exception will be taken, allowing the content of the call stack buffer to be analysed before its contents are changed in a way that prevents the contents of the call stack buffer at the time the interesting instruction was executed to be determined.

As another example approach that can be taken to determine the further instruction, the instructing instruction designation circuitry 40 may identify as the further instruction any instruction appearing in the sequence of instructions after the interesting instruction up to, but not beyond, a next instruction of at least one given type. The actual instruction chosen as the further instruction is in this case not considered important, provided it is an instruction appearing after the interesting instruction and up to, but not beyond, a specified type of instruction. For instance, the specified type here could be a BL instruction, and such an approach will hence ensure that the synchronous exception occurs at least by the time the next BL instruction is encountered, without restricting exactly which instruction has the synchronous exception pended thereto.

Figure 6:
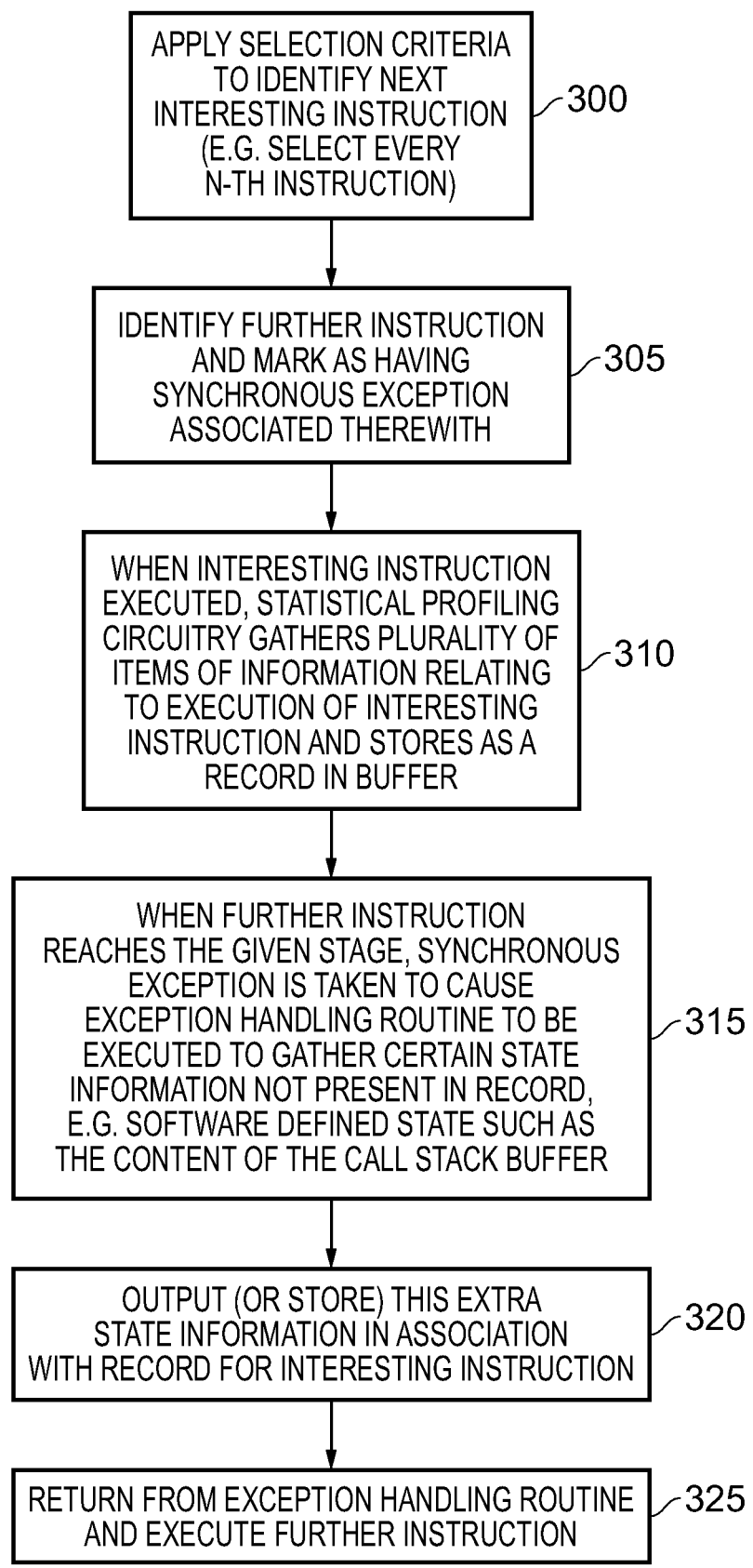
FIG. 6 is a flow diagram illustrating a statistical profiling technique that may be used in one example implementation.

FIG. 6 is a flow diagram illustrating how the techniques described herein may be used in association with statistical profiling, such as may be performed by the statistical profiling circuitry 65. At step 300, selection criteria are applied to identify the next interesting instruction, this selection criteria being applied by the interesting instruction designation circuitry 40. For the statistical profiling example, a number of criteria could be used, for example the criteria may merely select every N-th instruction within the sequence, or alternatively may look out for particular types of instructions to be flagged as interesting instructions.

At step 305, a further instruction is then identified by the interesting instruction designation circuitry 40, and that further instruction is marked as having a synchronous exception associated therewith. Any suitable scheme can be used for choosing the further instruction, such as for example using the techniques discussed earlier with reference to FIG. 5A to 5C.

At step 310, when the interesting instruction is executed, the statistical profiling circuitry can gather a plurality of items of information relating to execution of that interesting instruction and store that gathered information as a record within the buffer 70. Various types of information that could be gathered at this point have already been discussed earlier, such as the instruction address, instruction type, execution context, etc. In one particular example implementation, the usual information gathered can be supplemented by one or more additional items of information, such as for example the current call stack pointer value at the time the interesting instruction was executed. The gathering of that current call stack pointer value can assist in due course when seeking to analyse the contents of the call stack buffer that are obtained when the exception handling routine is later executed, for example by enabling a comparison of that call stack pointer value with the call stack pointer value that exists at the time the exception handling routine is executed.

At step 315, when the further instruction reaches the given stage mentioned earlier, then a synchronous exception is taken to cause the corresponding exception handling routine to be executed in order to gather certain state information not present in the record stored in the buffer 70. As discussed earlier, this can be certain software defined state such as the content of the call stack buffer 85.

At step 320 this extra state information is output, or stored, in association with the record for the interesting instruction, and then at step 325 processing returns to the exception handling routine, so as to allow the further instruction to be executed. By gathering this extra state information, this can provide additional useful contextual information when analysing the record produced by the statistical profiling circuitry for the interesting instruction. For example, by using the content of the call stack buffer as it existed at the time the interesting instruction was executed, it is possible to identify the sequence of subroutines that were executed prior to reaching the interesting instruction.

In instances where the further instruction is chosen to be the next BL or return instruction appearing following an interesting instruction, this can ensure that processing is still in the same subroutine as the subroutine within which the interesting instruction was encountered, at the time the exception handling routine is executed in order to capture the call stack buffer content. However, in situations where another criteria is chosen to select the further instruction, such as only the next return instruction or only the next BL instruction, it is possible that the call stack content will have changed, but it can still be ensured that none of the original call stack content present at the time the interesting instruction was executed has been overwritten. In such situations, by capturing the current call stack pointer value at the time the interesting instruction was executed within the record generated by the statistical profiling circuitry, it is possible to determine the exact form of the call stack buffer at the time the interesting instruction was executed. In particular, by comparing the call stack pointer value maintained in the record with the call stack pointer value that exists at the time the call stack buffer is analysed by the exception handling routine, it is possible to recreate the form of the call stack buffer at the time the interesting instruction was executed.

Figure 7:
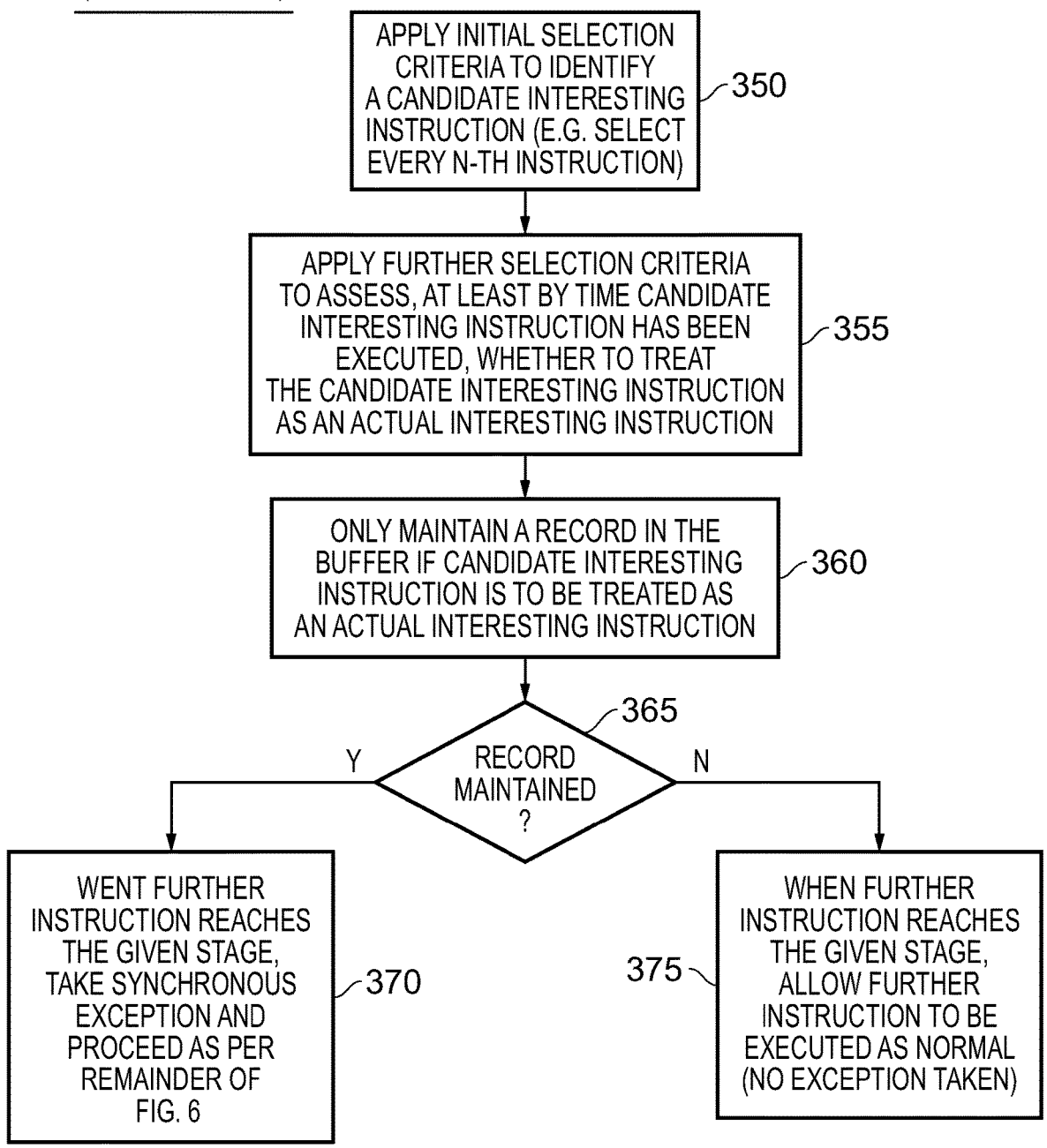
FIG. 7 is a flow diagram illustrating an alternative statistical profiling technique that can be used in accordance with one example implementation, where a filtering mechanism is employed.

FIG. 7 is a flow diagram illustrating an alternative approach that may be used when performing statistical profiling, making use of the techniques described earlier. In accordance with the scenario shown in FIG. 7, the interesting instruction designation circuitry 40 includes filter circuitry 45 that can be used to reduce the number of interesting instructions, and hence reduce the number of synchronous exceptions that are taken. In particular, as shown in FIG. 7 the interesting instruction designation circuitry 40 may apply initial selection criteria to identify a candidate interesting instruction at step 350. This could for example involve selecting every N-th instruction within the sequence. Then, at step 355, further selection criteria can be applied to assess, at least by the time the candidate interesting instruction had been executed, whether to treat the candidate interesting instruction as an actual interesting instruction.

The time at which this further selection criteria is applied may vary dependent upon implementation. For instance, it could be done up front, for example to exclude certain types of instruction from being interesting instructions. Hence, whereas the initial selection criteria may select every N-th instruction, the further selection criteria may look at the type of each such selected candidate interesting instruction, and exclude from further consideration certain types of instruction which it is known are not of particular interest. Alternatively, or in addition, the candidate interesting instructions may be allowed to proceed through the pipeline to the point of execution, but the behaviour of those instructions at the time of execution can then be analysed in order to decide whether they are still of interest, and hence should be maintained as actual interesting instructions.

By way of specific example, it may be that it is determined that only relatively slow load or store instructions are of interest. An initial filtering at step 355 may hence remove from further consideration any instructions that are not load or store instructions, whilst a later filter at the time of execution could then filter out any load or store instructions that executed relatively quickly, so as only to retain as actual interesting instructions the load or store instructions that are executed slowly.

At step 360, it is decided to only maintain a record in the buffer 70 if the candidate interesting instruction is to be treated as an actual interesting instruction. Hence, whilst at the time of execution of the candidate interesting instruction the statistical profiling circuitry 65 may go through the process of gathering the various pieces of information that would be stored within the record, if it is then determined that the candidate interesting instruction is no longer of interest, that record will not be maintained.

At step 365, in order to decide what steps to take in connection with the further instruction, it is then determined whether the record has been maintained. As mentioned earlier, the given stage at which the further instruction is assessed may be the execute stage or may be an earlier stage in the pipeline. In situations where the given stage is an earlier stage in the pipeline, it may be the case that handling of the further instruction is paused at that given stage until it is known whether the record is being maintained for the interesting instruction.

If the record is maintained, then the process proceeds to step 370 such that, when the further instruction reaches the given stage, a synchronous exception is taken and the process then proceeds as per the remainder of FIG. 6 (i.e. to implement steps 315, 320 and 325).

However, if the record is not maintained, then when the further instruction reaches the given stage, no synchronous exception is taken and the further instruction is allowed to proceed to execution as normal at step 375.

In situations where the decision as to whether to maintain the record or not for the interesting instruction occurs before the further instruction reaches the given stage, then in one example implementation the synchronous exception can remain pended to the further instruction, but then be ignored when the further instruction reaches the given stage if it is determined that the record has not been maintained. Alternatively, if it is decided that the record is not being maintained, the synchronous exception can be removed from the further instruction so that by the time the further instruction reaches the given stage it no longer has the synchronous exception pended thereto, and accordingly will merely proceed to execution without any exception being taken.

Figure 8:
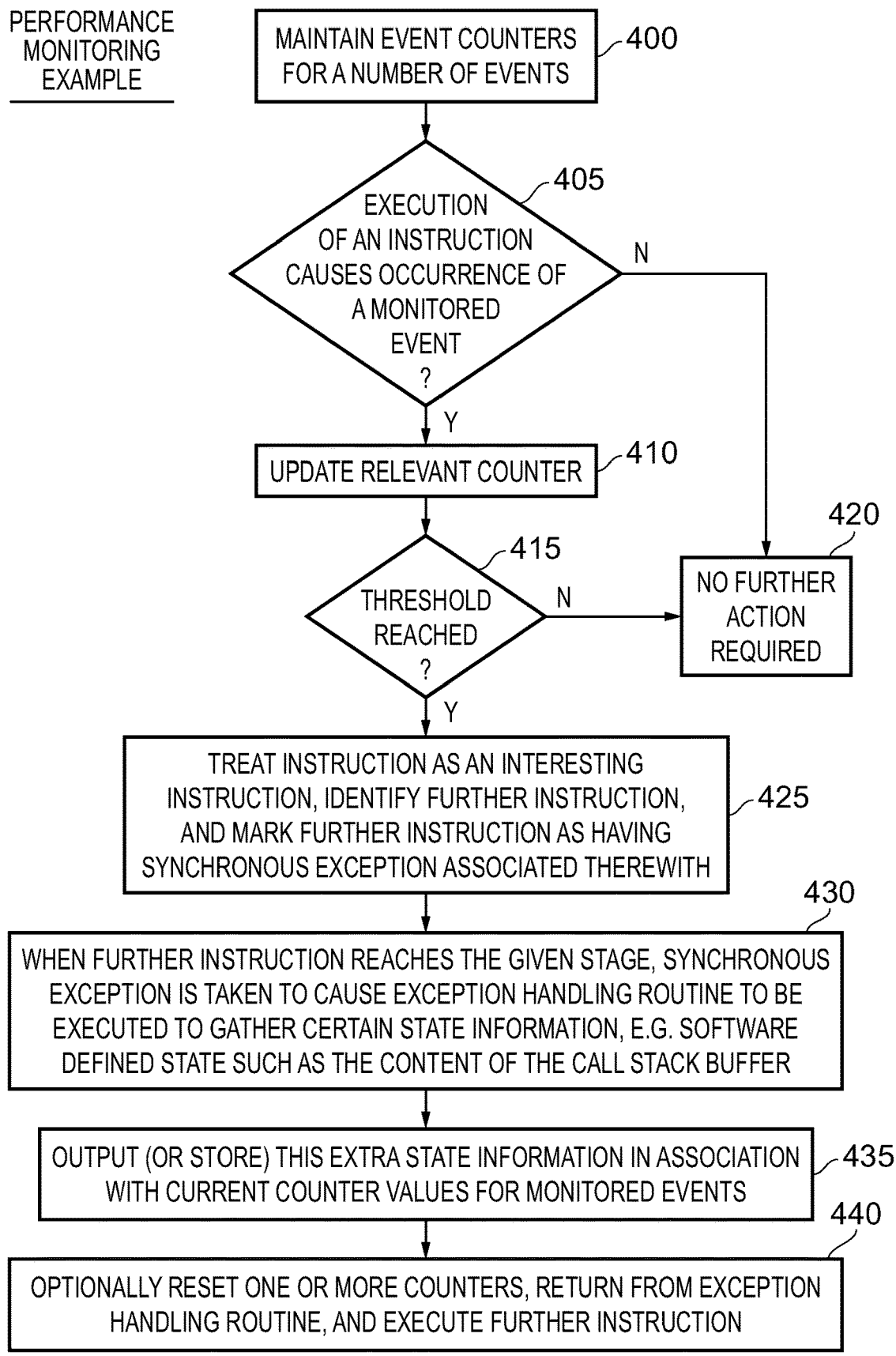
FIG. 8 is a flow diagram illustrating a performance monitoring technique that may be used in accordance with one example implementation.

FIG. 8 is a flow diagram illustrating a performance monitoring technique that may be employed, when utilising the earlier described techniques. At step 400, the PMU 75 maintains event counters 80 for a number of events. At step 405 it is determined whether execution of an instruction causes occurrence of one of the monitored events, and if not no further action is required at step 420. However, if execution of an instruction does cause occurrence of a monitored event, then the relevant counter is updated at step 410, and it is then assessed at step 415 whether a threshold level has been reached for that counter. If not, no further action is needed at step 420.

However, if at step 415 it is determined that the threshold level has been reached, then the instruction that caused the occurrence of the monitored event to take place is treated at step 425 as an interesting instruction. Accordingly, a further instruction is identified for that interesting instruction, and that further instruction is marked as having a synchronous exception associated therewith.

When the further instruction reaches the given stage, then at step 430 a synchronous exception is then taken to cause the exception handling routine to be executed to gather certain state information. This can take a variety of forms, for example software defined state such as the content of the call stack buffer discussed earlier.

At step 435, this extra state information is output, or stored, in association with the current counter values for the monitored events as maintained by the PMU. This hence provides additional contextual information that can be used when analysing those counter values.

At step 440 it may optionally be decided to reset one or more of the counters. For example, it may at least be appropriate to reset the counter that has reached the threshold level. In addition, the processing then returns from the exception handling routine, allowing the further instruction to proceed to execution.

Figure 9:
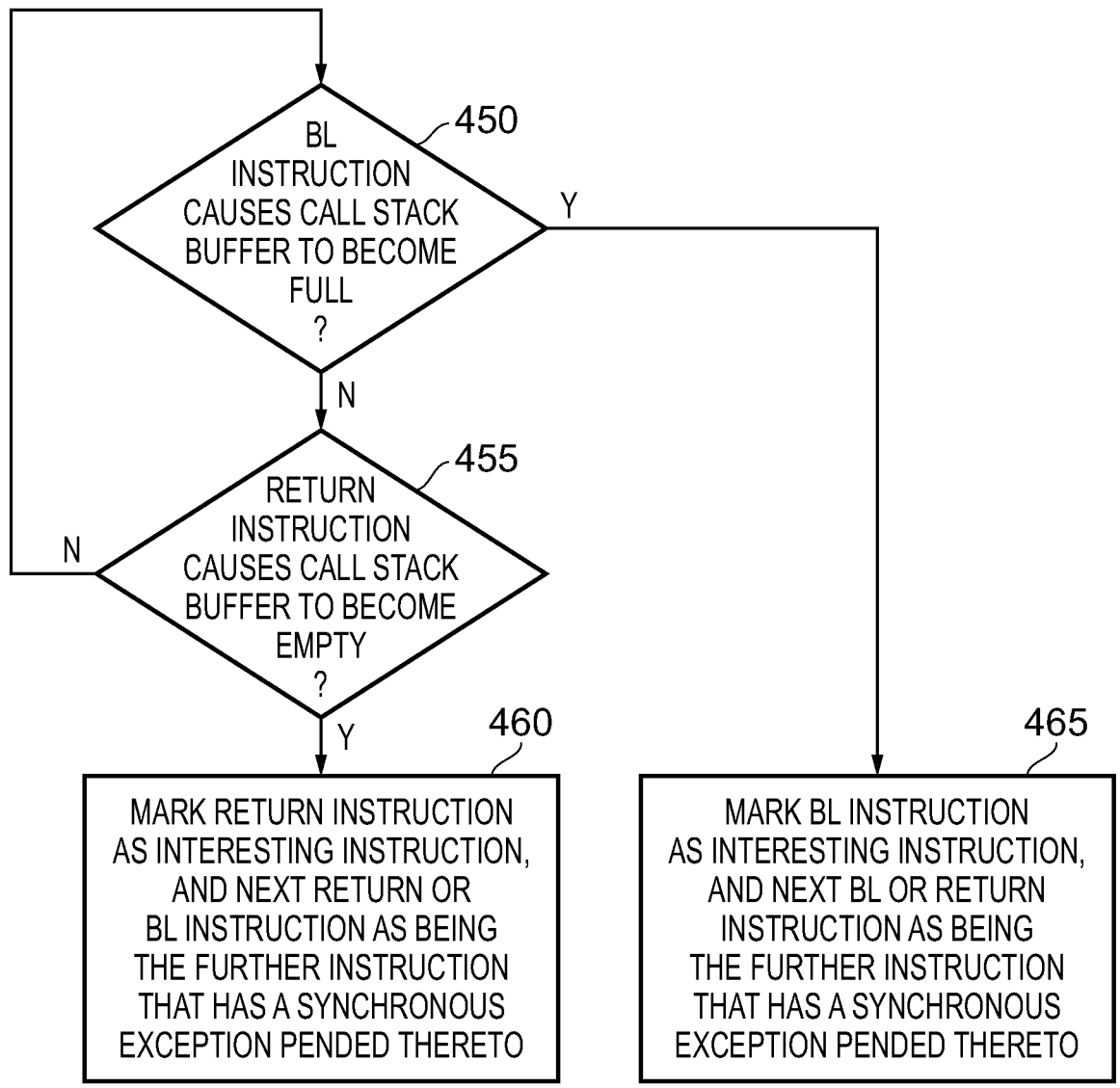
FIG. 9 is a flow diagram illustrating how the interesting instruction designation circuitry may be used in association with a call stack buffer in accordance with one example implementation.

FIG. 9 is a flow diagram illustrating a further example use case of the techniques described herein, in order to track situations where the call stack buffer reaches a threshold level of fullness or emptiness. At step 450, when a BL instruction is executed, it is determined whether execution of that BL instruction causes the call stack buffer to become full. If so, then at step 465 that BL instruction is marked as an interesting instruction, and then in the example shown in FIG. 9 the next branch with link or return instruction (whichever occurs first) is marked as being the further instruction that has a synchronous exception pended thereto. Of particular interest would be a next BL instruction that occurred before any intervening return instruction, since this would then seek to add a further entry to the call stack buffer when the call stack buffer is already full. However, for procedural efficiency it can be considered easier to merely mark as the further instruction whichever BL or return instruction occurs next within the instruction sequence. Alternatively it may only be the next BL instruction that is used as the further instruction.

If at step 450 it is determined that the BL instruction does not cause the call stack buffer to become full, it is then determined at step 455 whether a return instruction is being executed that causes the call stack buffer to become empty. If not, the process returns to step 450.

However, if it is determined that a return instruction has been executed that causes the call stack buffer to become empty, then at step 460 the return instruction is marked as an interesting instruction, and in the example shown in FIG. 9 the next return or BL instruction is marked as being the further instruction that has a synchronous exception pended thereto. Of particular interest is the scenario where the return instruction that caused the call stack buffer to become empty is followed by another return instruction, that would then be seeking to pop an entry from the call stack buffer in a situation where the call stack buffer was empty. However, for procedural efficiency it can be easier merely to mark whichever one of the next return or BL instruction occurs first following the interesting instruction. Alternatively, the interesting instruction designation circuitry 40 may be arranged to only look for the next return instruction following the interesting instruction and mark that as the further instruction.

Figure 10:
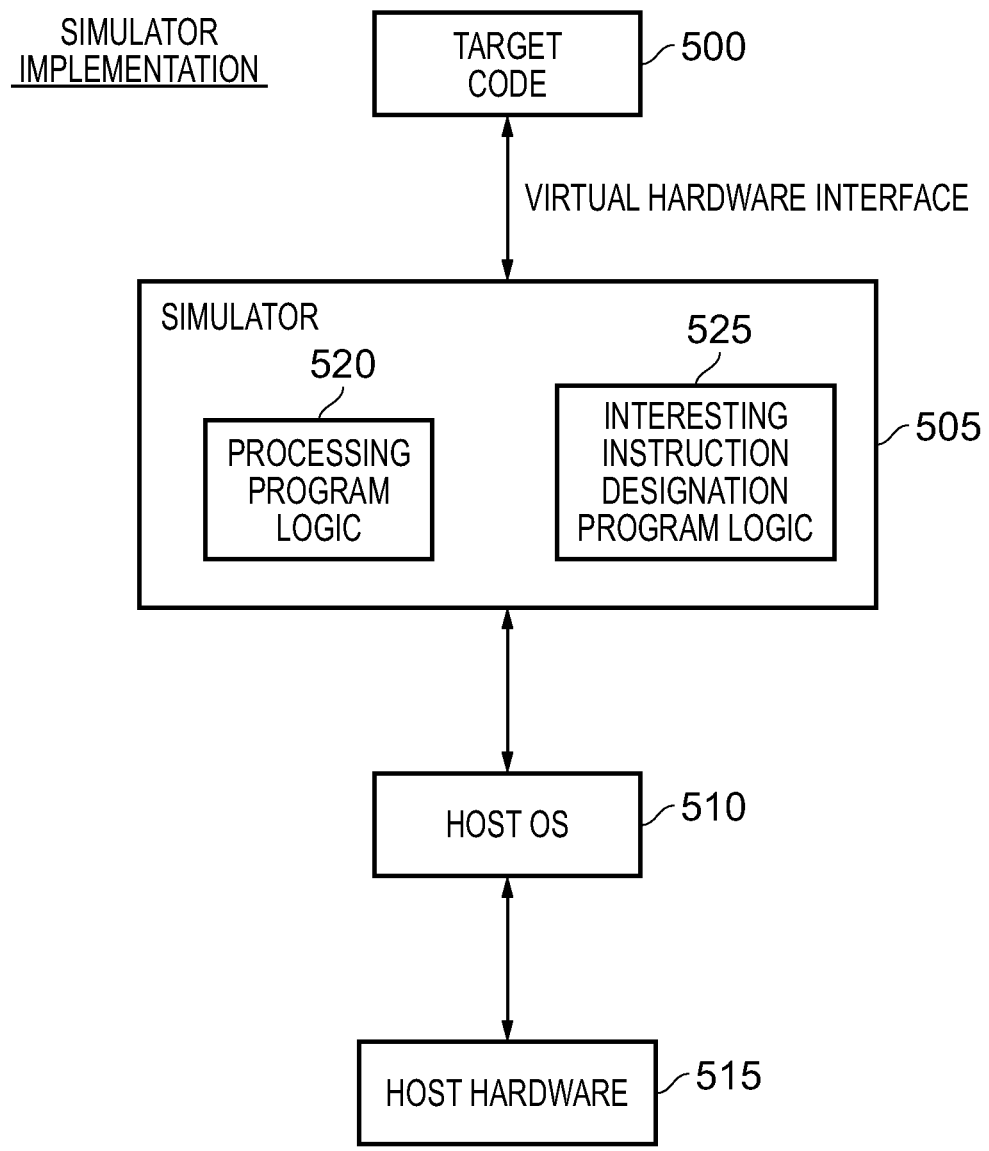
FIG. 10 illustrates a simulator implementation that can be used.

FIG. 10 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically a simulator implementation may run on a host processor 515, optionally running a host operating system 510, supporting the simulator program 505. In some arrangements there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990, USENIX Conference, Pages 53 to 63.

To the extent that examples have previously been described with reference to particular hardware constructs or features, in a simulated implementation equivalent functionality may be provided by suitable software constructs or features. For example, particular circuitry may be provided in a simulated implementation as computer program logic. Similarly, memory hardware, such as register or cache, may be provided in a simulated implementation as a software data structure. Also, the physical address space used to access memory in the hardware apparatus could be emulated as a simulated address space which is mapped on to the virtual address space used by the host operating system 510 by the simulator 505. In arrangements where one or more of the hardware elements referenced in the previously described examples are present on the host hardware (for example host processor 515), some simulated implementations may make use of the host hardware, where suitable.

The simulator program 505 may be stored on a computer readable storage medium (which may be a non-transitory medium), and provides a virtual hardware interface (instruction execution environment) to the target code 500 (which may include applications, guest operating systems and a hypervisor) which is the same as the hardware interface of the hardware architecture being modelled by the simulator program 505. Thus, the program instructions of the target code 500 may be executed from within the instruction execution environment using the simulator program 505, so that a host computer 515 which does not actually have the hardware features of the apparatus discussed above can emulate those features. The simulator program may include processing program logic 520 to emulate the behaviour of the processing pipeline 10, and interesting instruction designation program logic 525 to emulate the behaviour of the interesting instruction designation circuitry 40. The architectural registers 60 of the system may also be emulated using data structure emulating program logic (not shown) maintained by the simulator code 505, for mapping the architectural registers of a target architecture on to the memory space used by the host hardware 515. Hence, the techniques described herein for collecting state information of an apparatus can in the example of FIG. 10 be performed in software by the simulator program 505.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a processing pipeline to execute a sequence of instructions; and
interesting instruction designation circuitry to identify at least one of the instructions in the sequence as being an interesting instruction, each interesting instruction being an instruction for which given state information of the apparatus associated with execution of that interesting instruction is to be collected;
wherein:
the interesting instruction designation circuitry is arranged, for each identified interesting instruction, to apply defined criteria to determine a further instruction later in the sequence of instructions than that interesting instruction, and to mark that further instruction as having a synchronous exception associated therewith; and
the processing pipeline is responsive to the further instruction reaching a given stage of the processing pipeline and being marked as having the synchronous exception associated therewith, to trigger the synchronous exception instead of executing the further instruction, which causes the processing pipeline to execute a given exception handling routine in order to collect the given state information.

2. The apparatus as claimed in claim 1, wherein on returning from the given exception handling routine the processing pipeline is arranged to execute the further instruction.

3. The apparatus as claimed in claim 1, wherein the defined criteria cause the interesting instruction designation circuitry to determine, as the further instruction, an instruction appearing at a predetermined position in the sequence of instructions relative to the interesting instruction.

4. The apparatus as claimed in claim 3, wherein the defined criteria cause the interesting instruction designation circuitry to determine, as the further instruction, an instruction immediately following the interesting instruction in the sequence of instructions.

5. The apparatus as claimed in claim 1, wherein the defined criteria cause the interesting instruction designation circuitry to determine, as the further instruction, an instruction of at least one given type appearing in the sequence of instructions after the interesting instruction.

6. The apparatus as claimed in claim 5, wherein the instruction of the at least one given type comprises at least one of:
a return instruction used to return the processing pipeline to execution of program code that was being executed prior to execution of a current subroutine; and
a branch with link instruction that, when executed, will cause the processing pipeline to halt processing of a current subroutine and begin executing a further subroutine.

7. The apparatus as claimed in claim 1, wherein the defined criteria cause the interesting instruction designation circuitry to determine, as the further instruction, any instruction appearing in the sequence of instructions after the interesting instruction up to, but not beyond, a next instruction of at least one given type appearing in the sequence of instructions after the interesting instruction.

8. The apparatus as claimed in claim 1, further comprising:
   statistical profiling circuitry, responsive to execution of a given interesting instruction, to generate a record comprising a plurality of items of information relating to the execution of that given interesting instruction; and
   the given state information collected by executing the given exception handling routine comprises additional information not included in the record generated by the statistical profiling circuitry.

9. The apparatus as claimed in claim 8, wherein the additional information comprises at least one item of software defined state associated with execution of the given interesting instruction.

10. The apparatus as claimed in claim 9, wherein the at least one item of software defined state comprises content of a call stack buffer maintained by the apparatus.

11. The apparatus as claimed in claim 10, wherein the statistical profiling circuitry is arranged to include, within the plurality of items of information relating to the execution of the given interesting instruction, an indication of a current call stack buffer pointer value at a time the given interesting instruction was executed.

12. The apparatus as claimed in claim 8, wherein the interesting instruction designation circuitry is arranged to apply selection criteria to identify each interesting instruction for which the statistical profiling circuitry is to record the plurality of items of information when that interesting instruction is executed.

13. The apparatus as claimed in claim 12, wherein:
   the selection criteria comprise initial selection criteria and further selection criteria;
   the interesting instruction designation circuitry is arranged to apply the initial selection criteria in order to identify candidate interesting instructions; and
   the interesting instruction designation circuitry comprises filter circuitry to apply the further selection criteria to determine which candidate interesting instructions are to be used as the interesting instructions.

14. The apparatus as claimed in claim 13, wherein at least one of:
   the filter circuitry is arranged to only treat a candidate interesting instruction as being an interesting instruction when a type of that candidate interesting instruction is of one or more given types of instruction; and
   the filter circuitry is arranged to treat a candidate interesting instruction as being an interesting instruction when a given behaviour is observed when that candidate interesting instruction is executed.

15. The apparatus as claimed in claim 13, wherein:
   the filter circuitry is arranged to treat a candidate interesting instruction as being an interesting instruction when a given behaviour is observed when that candidate interesting instruction is executed; and
   the statistical profiling circuitry is responsive to execution of a given candidate interesting instruction to obtain the plurality of items of information relating to the execution of that given candidate interesting instruction, but to only maintain the record comprising those plurality of items of information when the filter circuitry determines that the given behaviour is observed.

16. The apparatus as claimed in claim 1, further comprising:
   performance monitoring circuitry to maintain a record indicative of occurrences of one or more events during execution of the sequence of instructions; and
   the interesting instruction designation circuitry is arranged to identify a given instruction in the sequence as being an interesting instruction when execution of that given instruction causes a given event to occur and the performance monitoring circuitry indicates that the occurrences of that given event have reached a threshold level.

17. The apparatus as claimed in claim 16 wherein at least one of:
   execution of the given exception handling routine in response to the further instruction associated with the given instruction reaching the given stage of the processing pipeline, causes a current state of the record maintained by the performance monitoring circuitry to be captured in addition to the given state information; and
   the record maintained by the performance monitoring circuitry comprises, for each of the one or more events, a counter value indicating a number of occurrences of that event since the counter value was initialised.

18. The apparatus as claimed in claim 1, further comprising:
   a call stack buffer to maintain information used to handle transitions between subroutines, wherein an entry is added to the call stack buffer each time a branch with link instruction is encountered in order to capture information used when returning from a subroutine entered in response to that branch with link instruction, and a most recently added entry is removed and the information stored therein consumed each time a return instruction is encountered; and
   the interesting instruction designation circuitry is arranged to identify a given instruction in the sequence as being an interesting instruction when execution of that given instruction causes a number of entries in the call stack buffer to reach a trigger level.

19. A method of collecting given state information of an apparatus comprising:
   employing a processing pipeline to execute a sequence of instructions; and
   identifying at least one of the instructions in the sequence as being an interesting instruction, each interesting instruction being an instruction for which given state information of the apparatus associated with execution of that interesting instruction is to be collected;
   for each identified interesting instruction, applying defined criteria to determine a further instruction later in the sequence of instructions than that interesting instruction, and marking that further instruction as having a synchronous exception associated therewith; and
   responsive to the further instruction reaching a given stage of the processing pipeline and being marked as having the synchronous exception associated therewith, triggering the synchronous exception instead of executing the further instruction, which causes the processing pipeline to execute a given exception handling routine in order to collect the given state information.

20. A non-transitory computer-readable storage medium storing a computer program for controlling a host data processing apparatus to provide an instruction execution environment comprising:

processing program logic to execute a sequence of instructions in a series of pipeline stages; and interesting instruction designation program logic to identify at least one of the instructions in the sequence as being an interesting instruction, each interesting instruction being an instruction for which given state information associated with execution of that interesting instruction is to be collected;

wherein:

the interesting instruction designation program logic is arranged, for each identified interesting instruction, to apply defined criteria to determine a further instruction later in the sequence of instructions than that interesting instruction, and to mark that further instruction as having a synchronous exception associated therewith; and the processing program logic is responsive to the further instruction reaching a given pipeline stage and being marked as having the synchronous exception associated therewith, to trigger the synchronous exception instead of executing the further instruction, which causes the processing program logic to execute a given exception handling routine in order to collect the given state information.

* * * * *